(12) United States Patent
Coulter

(10) Patent No.: US 8,656,095 B2
(45) Date of Patent: Feb. 18, 2014

(54) DIGITAL FORENSIC ACQUISITION KIT AND METHODS OF USE THEREOF

(75) Inventor: Chris Coulter, McLean, VA (US)

(73) Assignee: Cylance, Inc., Irvine, CA (US)

( * ) Notice: Subject to any disclaimer, the term of this patent is extended or adjusted under 35 U.S.C. 154(b) by 331 days.

(21) Appl. No.: 13/019,796

(22) Filed: Feb. 2, 2011

(65) Prior Publication Data

US 2011/0191533 A1 Aug. 4, 2011

Related U.S. Application Data

(60) Provisional application No. 61/356,927, filed on Jun. 21, 2010, provisional application No. 61/300,450, filed on Feb. 2, 2010.

(51) Int. Cl.
*G06F 12/16* (2006.01)

(52) U.S. Cl.
USPC .................. 711/112; 711/162; 711/E12.103

(58) Field of Classification Search
None
See application file for complete search history.

(56) References Cited

U.S. PATENT DOCUMENTS

| | | |
|---|---|---|
| 2007/0226170 A1 | 9/2007 | Sun |
| 2009/0164522 A1* | 6/2009 | Fahey .................. 707/104.1 |
| 2009/0287910 A1* | 11/2009 | Wilson .................. 712/220 |
| 2009/0288164 A1 | 11/2009 | Adelstein et al. |
| 2010/0005073 A1 | 1/2010 | Bousquet et al. |
| 2010/0241977 A1* | 9/2010 | Greetham ............... 715/764 |
| 2011/0041058 A1* | 2/2011 | Butler et al. ........... 715/709 |
| 2011/0055637 A1* | 3/2011 | Clemm et al. ........... 714/39 |
| 2012/0084856 A1* | 4/2012 | Hom et al. ............... 726/21 |
| 2012/0102571 A1* | 4/2012 | Sheldon .................. 726/26 |

* cited by examiner

*Primary Examiner* — Kevin Verbrugge
(74) *Attorney, Agent, or Firm* — Mintz, Levin, Cohn, Ferris, Glovsky and Popeo, P.C.

(57) ABSTRACT

Disclosed are compositions, methods, and kits, for issuing and conducting automated imaging and preservation for obtaining digital forensic data from active (i.e., powered-on) and non-active (i.e., powered-off) computer systems. In certain embodiments, the invention further encompasses providing a customer base a preliminary report of data. In other embodiments, the invention encompasses the option to receive a virtual machine file set of the acquired information for additional viewing and examination by the customer. The invention further encompasses methods and systems for implementing the embodiments of the invention. The invention also encompasses methods, apparatuses, and systems for secure forensic investigation of a target machine.

23 Claims, 7 Drawing Sheets

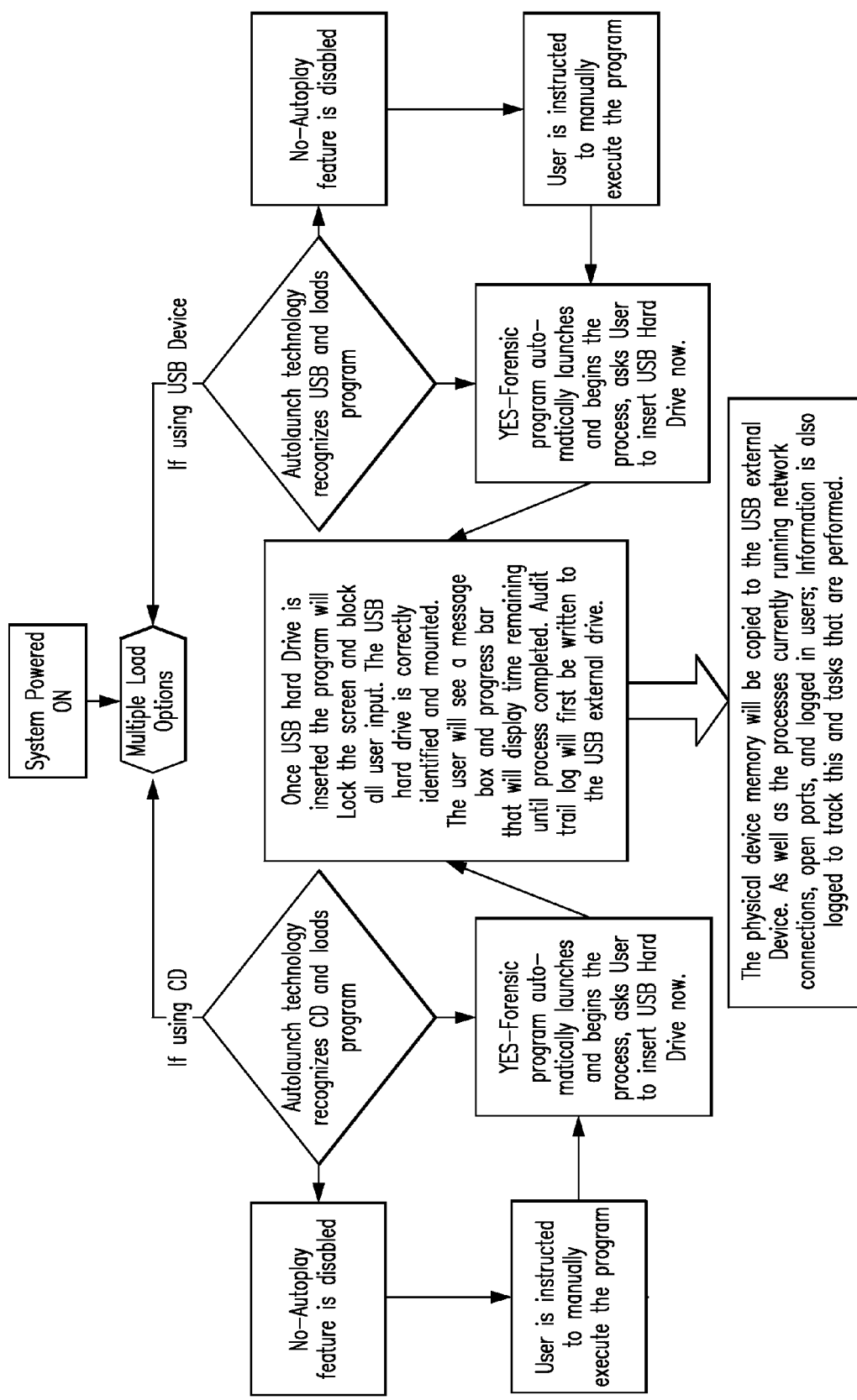

DIGITAL FORENSIC ACQUISITION KIT AND METHODS OF USE THEREOF

FIELD OF THE INVENTION

The invention encompasses compositions, methods, and kits, for issuing and conducting automated imaging and preservation for obtaining digital forensic data from active (i.e., powered-on) and non-active (i.e., powered-off) computer systems. In certain embodiments, the invention further encompasses providing a customer base a preliminary report of data. In other embodiments, the invention encompasses the option to receive a virtual machine file set of the acquired information for additional viewing and examination by the customer. The invention further encompasses methods and systems for implementing the embodiments of the invention. The invention also encompasses methods, apparatuses, and systems for secure forensic investigation of a target machine.

BACKGROUND

Computer forensics is the application of computer investigation and analysis techniques to identify and capture potential legal evidence stored or otherwise maintained within a computing device. The evidence might be sought during an investigation for a wide range of potential computer crimes or misuse, including theft of trade secrets, theft of service, theft of or destruction of intellectual property, fraud, hacking, and other criminal or misuse activities. In addition, the evidence may be useful for non-criminal investigational activities including divorce or separation proceedings. Unlike paper evidence, computer evidence can exist in many forms, with earlier versions and even some deleted versions of the evidence still accessible on a storage medium. Forms of computer evidence may include, for example, system log files, executing processes, stored files and the like.

An investigator may draw on an array of methods to discover and capture evidence from a computer device. One common method for obtaining computer evidence is on-site inspections or seizure of the computer. For example, the investigator may physically connect an analysis device to the target computer or load analysis software on the target device to acquire and analyze the computer evidence. However, when these discovery techniques are used on computers critical to a network, e.g., servers, the investigation may become burdensome on the network users. Moreover, it is often desired to collect evidence from a computer over time without being detected by a perpetrator of the crime, which can be difficult with many of these invasive techniques.

Computer forensic analysis software may enable the efficient management, analysis and searching of large volumes of computer data by being able to view and analyze, for example, such storage devices such as disk drives at the disk level without having to go through, for example, intermediate operating system software. Forensic analysis scripting tools may be used to target and automate analysis of large volumes of computer data. Accordingly, computer forensics analysis software may be an advantageous tool for related but non-forensic investigation purposes, such as computer auditing and information assurance.

Current computer forensics analysis tools commonly work either from an image copy of a storage device or over a link coupled between the parallel ports of the analyzing computer and the target computer. Commonly used, non-forensic, methods of searching, reviewing, and copying logical tiles over a network may have a shortcoming in that time stamps and existing data may be altered or destroyed in the process.

There is no economical, straight-forward computer forensic solution for identifying evidence or activity conducted on a computer currently available today.

The inventors have developed a product and process that can be used by an untrained consumer to receive a highly detailed report to be generated from the collected forensic image or raw data contained on a computer system to reveal computer activity and evidence on a computer. This report will be issued under the supervision of trained forensic examiners meaning it can suffice as evidence in a court of law for various legal situations. Additionally, users can have the option to view the data in a manner that emulates the Windows Operating System, by using the evidence as a compiled Virtual Machine.

SUMMARY OF THE INVENTION

The inventors have developed methods and systems for computer forensics, and specifically an automatic data collection and preservation tool that collects data at the physical level by using a bit-stream copy process. Additionally, the invention utilizes an automated report generation that can be initiated by a digital forensic examiner. The invention also includes the option to have a pre-compiled virtual machine file set, allowing navigation of evidence as if an individual were at the physical machine.

In one embodiment, the invention encompasses a digital forensic acquisition kit ("Forensic Kit") including hardware, software, and step by step instructions to allow a user to image/acquire/preserve attached digital media on a computer, while maintaining an audit trail and upholding basic digital forensic best practices. In certain embodiments, the Forensic Kit can be housed in a small high grade foam lined container, such as a "Pelican" case or other similar container.

In certain embodiments, included in the Forensic Kit is pre-loaded software, which will automate the collection, and at the interface level of this software no user input is required or allowed, making for a fully autonomous forensic data capture.

In certain embodiments, user input is optional on the physical hardware level, using a CD-ROM and/or an External Drive such as for example an external USB or firewire hard drive or flash memory drive or other external media, which is connected/inserted to execute the autonomous data collection process.

In certain embodiments, a custom report from the raw forensic data collected using the Forensic Kit can be generated based on a specific request. In the event that no specific topic is requested a general discovery report will be generated.

In certain embodiments, the Forensic Kit includes one or more of the following; varying capacity External Hard Drive(s), peripherals, CD-ROM, Address and Pre-Paid Postage, Strip of Tamper-Evident Tape or Plastic Tamper Evident Tie, Single Use Camera, and Detailed Instructions for using the kit. The above mentioned media include the program and scripts to automatically execute a forensic data preservation using the kits contents as directed by the included instructions.

In certain embodiments, the forensic software included in the Forensic Kit takes all measures to ensure evidence is collected in a forensic manner, meaning little to no alteration of data occurs during the collection and preservation of evidence.

In certain embodiments, the Forensic Kit can forensically collect data in an automated fashion.

In certain embodiments, the Forensic Kit securely protects data once the acquisition has completed.

In certain embodiments, the Forensic Kit performs one or more of the following to a live "running" Windows or Macintosh based Operating System:
a. Automated Live Physical Memory (RAM) Acquisition to the Forensic Hard Drive, requiring user input only at the physical level, by connecting the Forensic Hard Drive or inserting the CD-ROM or both.
b. Automated capture of running processes, open files, network connections including IP information, firewall configuration, Mapped Network Drives, active network ports, and screen capture, to the Forensic Hard Drive.
c. Drive, requiring user input only at the physical level, by connecting the Forensic Hard Drive or inserting the CD-ROM or both.

In certain embodiments, the automated Live forensic acquisition of memory, attached physical media, running process, open files, network connections including IP information, firewall configuration, Mapped Network Drives, active network ports, and screen capture is executed and initiated by one of the following methods; automatic execution technologies, autorun or autoplay technology, automatic execution via U3 technology or similar, or by manual execution from USB or CD-ROM, once the USB or CD-ROM is inserted.

In certain embodiments, once the automated live forensic acquisition program has been initiated the system screen, keyboard, and mouse will be locked with only a progress bar and message indicating the process is being performed. In certain embodiments, no keyboard, network, mouse or other input is performed until the acquisition has completed.

In certain embodiments, once the Live Acquisition process has completed the user will be notified by a screen printed message that the process has completed and the option to hit "ENTER" or click "OK" to finish. However, if no input is entered a timer will execute the forensic program shutdown process, which will lock the Forensic Hard Drive using an ATA-Command, eject all the forensic media, and the system will be released back to the user in the same state it was in prior to the tool being executed with no apparent traces of its execution.

In certain embodiments, the Forensic Kit also allows a powered off automated forensic acquisition option.

In certain embodiments, the boot portions of the forensic copy software will be contained on either the CD or External Hard Drive or both and the load software on the external USB Hard drive or CD-ROM or both. In certain embodiments, when the copy process has completed the password to lock the Forensic External drive is based off of unique identifiers contained within the hard drive, and can-not be retrieved once the lock command has been issued.

In certain embodiments, the collection of the evidence will be launched from a UNIX based operating system that is run from either the CD or Hard Drive and will not write to any media.

In certain embodiments, the user can be instructed via the included instruction manual to insert either a CD-ROM, USB Hard Drive, or USB Floppy Disk Drive with Boot Disk to initiate the powered off forensic acquisition of ALL attached physical media of the system.

In certain embodiments, a bit-stream copy of the physical media is automatically performed and output to the Forensic Hard Drive.

In certain embodiments, once the entire script process has completed the user will only be instructed to remove the Forensic hard drive and/or CD if being used. Following these actions the computer will shut down automatically. However, if in the event no user input is entered a timer will automatically initiate the shutdown commands ejecting the CD and un-mounting the forensic hard drive, and powering the device off.

In certain embodiments, actual source code and software used to complete the copy process can be split between the Field kit hard drive and CD as to prevent direct access to the source code. If no CD is used, the External Hard Drive includes an Emulated Floppy boot disk, or Emulated boot CD, bootable partition; allowing booting directly off of the attached External Hard Drive which, will cover most BIOS boot settings without need for alteration. Alternatively, an attached Floppy disk drive can be used and included in the kit, for further compatibility reasons.

In certain embodiments, the process of "locking" the external hard drive initiates once the acquisition has completed and will be completed by sending an ATA-Command to the Forensic Hard Drive using a unique identifier embedded inside the forensic hard drive. This unique identifier password is not retrievable once the drive is locked.

In certain embodiments, an actual protection of the entire Forensic hard drive will be accomplished by having a script execute once the forensic acquisition process has completed which will send an ATA-Command to the Forensic hard drive locking it with a password that is based off of unique identifiers contained within the Forensic Hard Drive.

In certain embodiments, when outputting data, the correct output device or the forensic hard drive used for the export of evidence is correctly identified by using unique identifiers embedded in the forensic hard drive.

In certain embodiments, the customer can use a self enclosed mail label, and send via mail courier the captured forensic data, residing on the provided Forensic Hard Drive for the generation of the forensic report. Alternatively, if no forensic report is wanted the consumer does not have to return the kit.

In certain embodiments, the forensic report will be of a pre-generated format and will contain a static level of information reported. This will allow for a majority of the reporting to be conducted automatically.

In certain embodiments, the forensic report can be tailored to uncovering activity conducted via a computer as it relates to a particular topic, by using customized search terms related to the topic activities. In certain embodiments, standard keywords can be used to reveal evidence and activity in combination with data analysis techniques.

In certain embodiments, the forensic report will help provide digital evidence of activity conducted on a computer.

In certain embodiments, the forensic report can be tailored to uncovering computer based activity conducted via a computer, by using customized search terms that relate specifically to the topic area in question.

In certain embodiments, the forensic report will be custom tailored to areas of focus based on the consumers input upon purchasing the forensic kit either via phone or on the commerce web site, or other means. In certain embodiments, these areas are of focus will encompass sets of keyword search terms as they relate to the required reporting topic.

In certain embodiments, the report will include one or more of the following data that is extracted from the raw forensic image taken via the Forensic Field Kit:
A. Hash analysis, File Signature analysis
B. Deleted Folders recovery
C. keyword searches
D. Microsoft mail items
E. Contact
F. Steganography analysis G. multiple file format Data Carving
H. INFO2 Analysis
I. Web Mail Carving
J. Web Mail Analysis
K. Event Log Analysis
L. Gmail Data Carving
M. Gmail Message Reconstruction
N. Web based chat data carving
O. Registry analysis
P. ROT13 Registry decoding
Q. Attached Devices by Volume Serial
R. Attached Device Contents
S. Wiping program analysis
T. Last connected internet date/time
U. First install of OS
V. OS version & SP
W. System information
X. Windows Account Names and Passwords
Y. Geo-IP as last connected network
Z. Web Banking Data Carve
AA. Social Media analysis
AB. Deleted Items Analysis
AC. Top 10 most frequently occurring web URLs
AD. Proprietary subject matter URL Database discovery
AE. Search Term Analysis
AF. Encrypted and Protected file lists
AG. Link File Analysis
AH. Prefetch Analysis
AI. IPhone and Blackberry Synced/backup file parsing In certain embodiments, the automated reporting aspect can be initiated via a trained forensic Examiner and reviewed by a forensic examiner as to provide legitimacy and accuracy of results.

In certain embodiments, the automated forensic report can be initiated onsite using a processing machine provided to the customer and executed remotely by the supervision of a trained forensic examiner.

In certain embodiments, ideally the reporting aspect should process the data in an automatic fashion or semi automated fashion.

In certain embodiments, customers can request a copy of the Forensic Image to be provided in a standard forensic format, such as E01, DD, etc.

In certain embodiments, customers can request, along with a copy of the Forensic image, a pre-compiled Virtual Machine of the acquired evidence, made to work with either Sun's or VM-Ware's virtual machine technology. Additionally, either the user accounts will be reset/cracked or passwords provided to the customer.

In certain embodiments, the user can execute the virtual machine file which will emulate the hardware needed to bring the evidence into an emulated booted and restored fashion allowing the user the same level of computer access as if they were navigating the originally acquired evidence computer.

In certain embodiments, passwords will either be reset by using standard open source tools, alternatively passwords will be provided in their original plain text format for the user to enter into the Operating System login screen.

In certain embodiments, the methods can be hosted on the internet to ensure that outside internet connection on the emulated machine does not take place. Users will be given a web address and user name and password to log into a server that hosts the evidence which is on a Virtual Machine.

BRIEF DESCRIPTION OF THE FIGURES

A more complete understanding of the present invention may be obtained by reference to the accompanying drawings, when considered in conjunction with the subsequent detailed description. The embodiments illustrated in the drawings are intended only to exemplify the invention and should not be construed as limiting the invention to the illustrated embodiments, in which.

DETAILED DESCRIPTION OF THE INVENTION

Figure 1B:
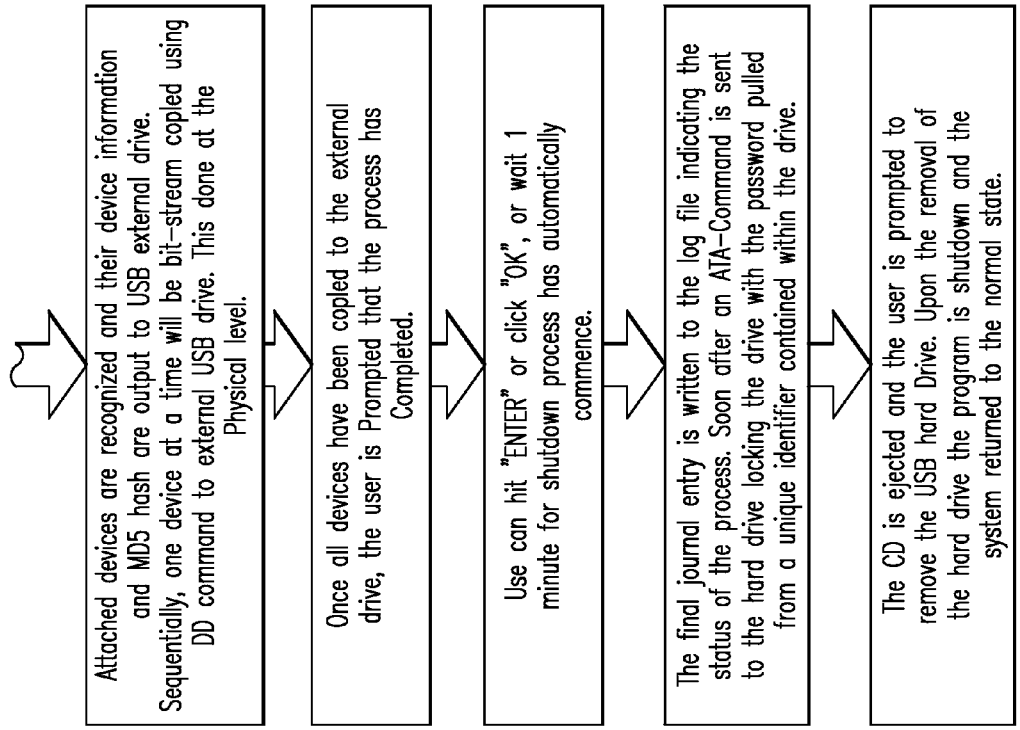
FIG. 1 illustrates a non-limiting, exemplary block diagram of a powered-on application of the forensic tool of the invention.
Figure 2A:
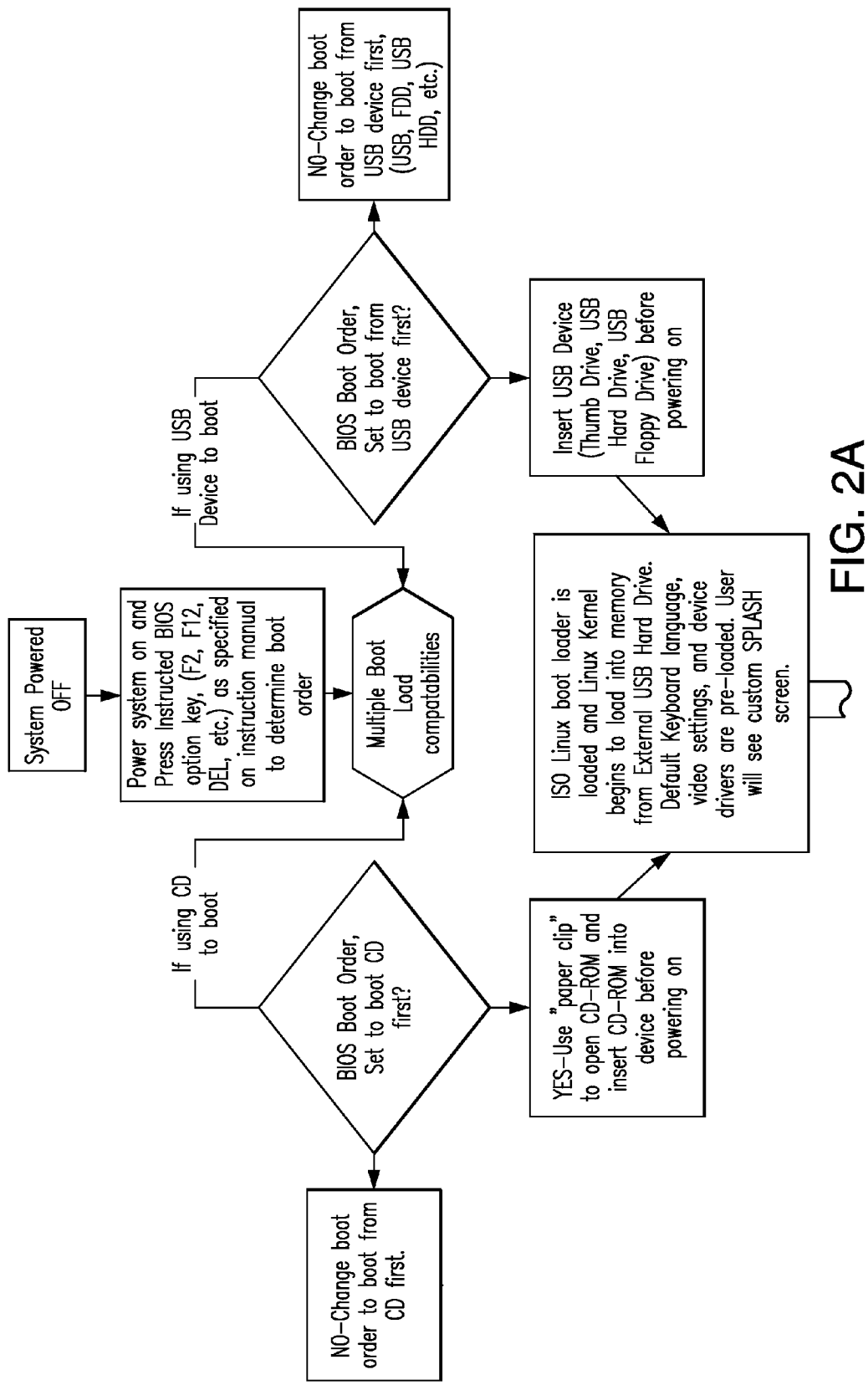
FIG. 2 illustrates a non-limiting, exemplary block diagram of powered-off application of the forensic tool of the invention.
Figure 2B:
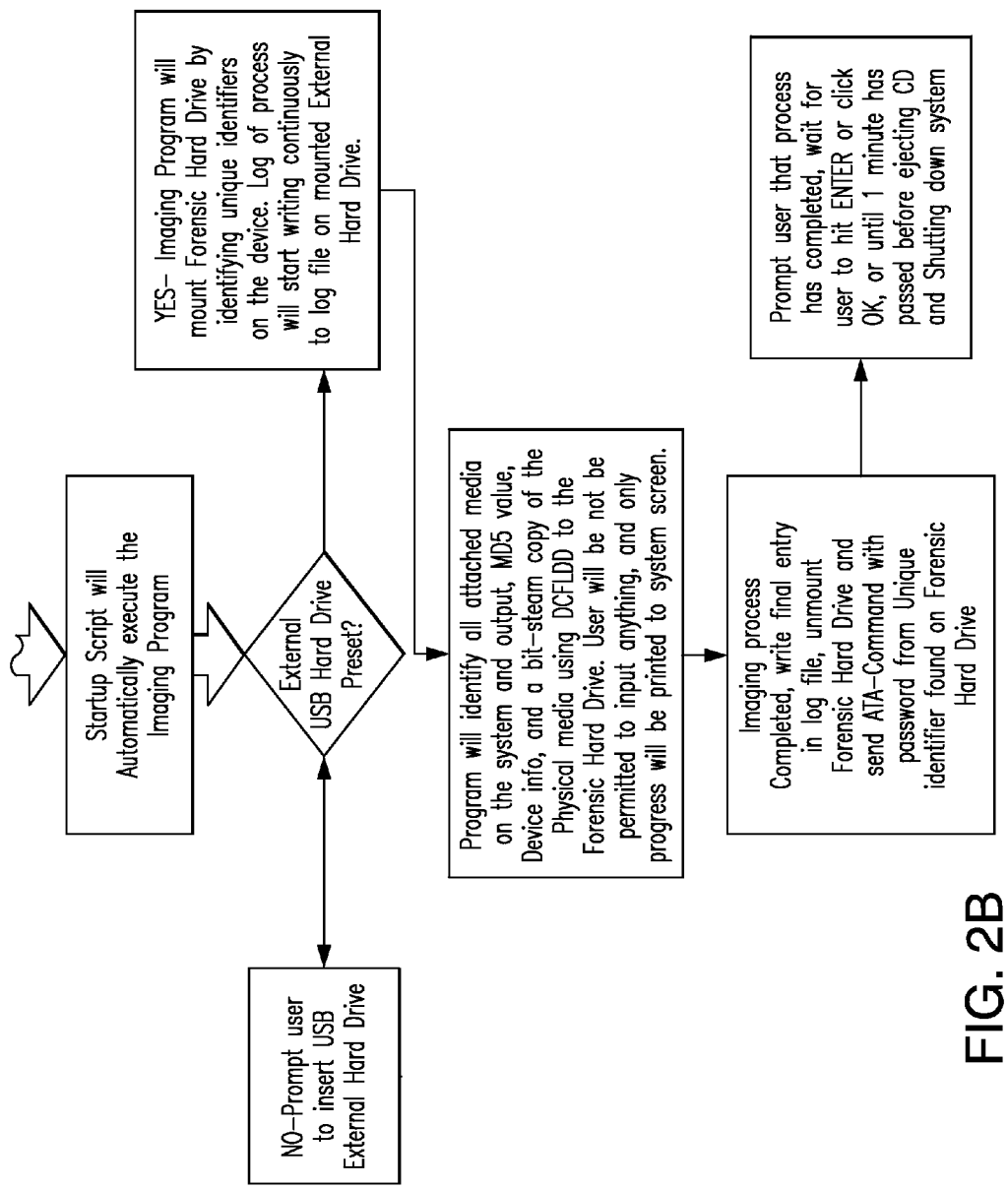

The invention generally encompasses an electronic forensics tool. According to one embodiment, the invention encompasses an electronic forensic tool comprising:
(a) a physical portable memory device, wherein said physical portable memory device is capable of connecting to a target device;
(b) a forensic acquisition script, wherein said forensic acquisition script is able to load onto said target device and analyze hardware and software configurations of said target device and copy physical memory from the target device to the physical portable memory device.

In certain embodiments, the physical portable memory device comprises one or more external USB Hard Drive or other external media to be connected and/or inserted to execute a data collection process.

In certain embodiments, the autorun forensic acquisition script comprises pre-loaded software, which will automate the collection, and at the interface level of this software no user input is required, making for a fully autonomous forensic data capture.

In certain embodiments, the physical portable memory device comprises a varying capacity external hard drive.

In certain embodiments, the forensic acquisition script examines said target device in read-only mode.

In certain embodiments, the forensic acquisition script examines data in the target device in read-only mode, wherein data is stored only in random access memory, without creating evidence of forensic activity on said target device.

In certain embodiments, the forensic acquisition script calculates digital signatures, message digests or hash values of available data storage devices in said target device to verify that no modifications are made of said devices.

In certain embodiments, the forensic acquisition script documents and logs information about said target device and documents and logs activity of said client program.

In certain embodiments, said client program documents and logs information about said target device and documents and logs activity of said client program for authentication, and wherein said log is digitally encrypted, signed and stored.

In certain embodiments, examination results are displayed in limited examination result comprise one or more of: data existence, numbers of keywords match, and one or more file attributes.

In certain embodiments, the limited examination further comprises one or more of keyword searching, keyword searching with context, data filtering, binary file signature searching, keyword searching through archives such as compressed or zipped files, keyword searching through encrypted or password protected files, physical keyword searching, Internet usage history parsing, searching by relevance, de-duping data, excluding data searches based on presence of data in one or more search databases; and including searches based on presence of data in one or more search databases.

In another embodiment, the invention encompasses a method of obtaining forensic data from a target computer comprising:

a. connecting a physical portable memory device to a target device; and
b. running a forensic acquisition script, wherein said forensic acquisition script is able to load onto said target device and analyze hardware and software configurations of said target device and copy physical memory from the target device to the physical portable memory device In certain embodiments, the physical portable memory device comprises one or more external USB Hard Drive or other external media to be connected and/or inserted to execute a data collection process.

In certain embodiments, the autorun forensic acquisition script comprises pre-loaded software, which will automate the collection, and at the interface level of this software no user input is required, making for a fully autonomous forensic data capture.

In certain embodiments, the physical portable memory device comprises a varying capacity external hard drive.

In certain embodiments, the forensic acquisition script examines said target device in read-only mode.

In certain embodiments, the forensic acquisition script examines data in the target device in read-only mode, wherein data is stored only in random access memory, without creating evidence of forensic activity on said target device.

In certain embodiments, the forensic acquisition script calculates digital signatures, message digests or hash values of available data storage devices in said target device to verify that no modifications are made of said devices.

In certain embodiments, the forensic acquisition script documents and logs information about said target device and documents and logs activity of said client program.

In certain embodiments, said client program documents and logs information about said target device and documents and logs activity of said client program for authentication, and wherein said log is digitally encrypted, signed and stored.

In certain embodiments, examination results are displayed in limited examination result comprise one or more of data existence, numbers of keywords match, and one or more file attributes.

In certain embodiments, the limited examination further comprises one or more of keyword searching, keyword searching with context, data filtering, binary file signature searching, keyword searching through archives such as compressed or zipped files, keyword searching through encrypted or password protected files, physical keyword searching, Internet usage history parsing, searching by relevance, de-duping data, excluding data searches based on presence of data in one or more search databases; and including searches based on presence of data in one or more search databases.

In certain embodiments, the invention further comprises an encrypted copy of entire data storage device of said target device or make an encrypted copy of data identified by said examination or command-block enabled examination of said target device.

In another embodiment, the invention generally encompasses an electronic forensics tool comprising:

(a) a physical portable memory device, wherein the physical portable memory device is capable of being connected to a target device;
(b) an autorun forensic acquisition script, wherein the autorun forensic acquisition script is able to load onto said target device and analyze hardware and software configurations of said target device and copies physical memory from the target device to the physical portable memory device, wherein the electronic forensics tool includes a digital memory storage device and separate software for booting and examining information on a target computer.

In one embodiment, a digital memory storage device, such as a CD containing the autorun software, is inserted or loaded into a target computer being analyzed. The software may be stored in a CD or any other suitable medium as known in the art. For example, the software may also be downloadable onto a USB memory device through the Internet. In the present example, a CD is used. The user is able to use the software repeatedly as desired to examine different drives and different computers. The client software may be used repeatedly on a single computer drive. The client software may also be used on different computer drives. The client software may further be used on different computers as desired.

In another embodiment, the invention encompasses an electronic forensics tool including a digital memory storage device, for example, a CD, which is capable of booting a target computer off of the CD. The electronic forensics tool of the present invention starts up from the CD. The electronic forensics tool may be displayed using simple, streamlined, intuitive graphical user interfaces (GUI). In one embodiment, the GUI may consist of a task oriented process flow, which guides the non-expert through the necessary steps to conduct a forensic examination. The non-expert would be guided through advanced concepts and critical decisions encountered during the process by context specific tutorials and documentation provided within the client GUI.

Once fully initialized, the electronic forensics tool will preferably automatically recognize various hardware platforms and software configurations and allow for rapid examination of forensic information. In certain embodiments, available drives of the target machine are preferably recognized and documented. In certain embodiments, the software can automatically displays a menu containing the drives, partitions or segments of available drives. In certain embodiments, any number of autorun technologies the forensic acquisition script will automatically be executed and will copy the Physical Memory to the Forensic Hard Drive first, followed by the running process, network connections, open network ports, screen capture of current screen and logged in users.

In certain embodiments, predefined and customized reports can be built and executed to allow for more functionality. In one embodiment, predefined filters which can be activated at the click of a button, could allow users to see entries specific to their investigation. Examples of these filters include the display of: only deleted files, only image and video files, only word processing documents, only e-mail files, only web surfing related files, and only archive files.

In certain embodiments, keyword searches may be used to provide the number of instances that a word or phrase appears on the drive. In other embodiments, counts of encrypted, password protected files may also be determined. In other embodiments, unallocated and slack space may also be analyzed for files and fragments that may be of interest. In other embodiments, previously deleted files may be recovered from unallocated space using file signature matching techniques. In other embodiments, a message digest may be calculated for all files on the device and compared to a database of known files to include/preclude them for/from further investigation. Thus, through the various filters and searches provided, a user is able to identify a set of relevant documents or data fragments.

In certain embodiments, limited information about the data of interest is revealed. These features of the client software provide an easy tool for determining whether data of interest resides on the target computer. Should the user elect to examine the actual data, a copy of the underlying searched data must be extracted from the target machine either in part or in its entirety. This can be accomplished by obtaining a command block from a control server or by exporting the entire contents of the drive for analysis by a third party vendor.

A user will preferably access the control server through an online computer that is different from the target computer. Using the server, a user is able to create and/or purchase command blocks. A user will thus be able to construct, pay and obtain command blocks from the control server in an automated fashion. Once obtained, the command blocks are transferred to an external storage device, such as a USB drive. A USB drive may be connected to the online computer to facilitate this process.

Command blocks may be priced according to various factors such as the type and size of information involved. Factors may include, among others, size of drives analyzed, whether visible files, deleted files, FAT data, unallocated space or slack space are included, and whether recovery of lost partitions, keyword searches, web page fragment analysis, recovering Internet surfing history through parsing of history files, and de-duping recovered data are also enabled. For example, exporting of visible and deleted files based on the FAT data may be priced differently from more complicated functions such as extraction of files from unallocated and slack space. Extraction of data based on keyword searches may incur an additional fee. Command block prices may also depend on drive size. Other functions such as parsing of Internet surfing history files and de-duping of recovered data may also incur additional charges.

Command blocks may also be sold for specific types of analysis at a set rate. For example, a "pornography investigation" command block, would extract all images, movies and related web surfing activity involving pornographic material. The present invention also contemplates pricing structures based on pre-purchased bundles or packages or on client status, such as the client being classified as a frequent user.

The command block stored on an external memory device (i.e., a USB drive) is accessed by the target computer, wherein the software recognizes and authenticates the command block and allows the data of interest to be downloaded onto the external memory device without possibility of modifying other devices or drives in the target computer. The desired data may be analyzed with a modification-detection scheme possibly involving MD-5, SHA-1 or SHA-256 hashing to protect the integrity of the data cm the external drive.

Once extracted, drive contents can be viewed by the user. With the extracted data, the user not only gets statistical data about the files but also the files in their native format. The user is now able to access and view the actual files themselves including any related meta-data. Thus, whereas the client program alone only displayed limited data about the documents or files, the command-block enhanced program allows the actual files and documents to be downloaded, for further analysis.

In lieu of extracting specific data of interest, once a device is known to be of interest, a user may wish to forensically export the entire contents of the device for analysis by a forensic expert. Using the client software, the user may create a forensically sound copy of the storage devices and export the copy to an external storage device. The copy may be encrypted and analyzed with a modification-detection scheme possibly involving MD-5, SHA-1 or SHA-256 hashing (or other methods as known in the art) to protect the integrity of the data on the external drive while it is physically delivered to a third party expert for analysis.

Through the process, forensically sound techniques are employed to prevent spoliation of evidence. All actions and diagnostics are logged. The log file(s) is (are) encrypted, signed, and stored for future analysis. If data is exported in an encrypted format, an unencrypted index file is created describing the contents of the recovered data.

If at the end or any other point in the process the user desires further assistance or if a computer forensic expert is needed, the data of interest can be delivered to a vendor to provide custom analysis of the data. This can be performed by delivering the destination drive containing either data extracted by the use of command blocks or a forensic copy of the entire contents of the target device/drive obtained by using a special feature in the client software.

In a preferred embodiment, the client software provides a mechanism for forensically exporting the entire contents of the target device/drive to the destination drive, Because digital evidence can be duplicated accurately using forensic techniques, a copy of the entire contents can be made for analysis by a forensic expert. By first copying the original evidence, the original evidence may be further protected against accidental or unintentional damage or alternation. These contents can be digitally signed and encrypted to ensure that they are not modified in transit. Upon delivery to a computer forensic expert, the contents can be decrypted and verified prior to forensic analysis. Such an option may be available to the user at any point in the process.

The present invention is preferably designed to operate with any known types of microprocessors and chip designs. At minimum, the target computer should preferably have hardware capabilities similar to those commonly available in the public. The present invention, however, may be designed to operate on computers with more exotic hardware as known in the art. Should a target computer not possess the minimum hardware requirements for a particular version of the present invention, the user will be informed of the limitations, and the present invention may operate in a reduced mode with limited functionality. Moreover, as technology progresses, the present invention may be operated on more advanced systems.

The client boots off the CD. The following is a description of one embodiment of the functional requirements of the client portion of the present invention. The present invention may be embodied in alternate forms without departing from the spirit of the present invention, and it should be understood that the description contained herein is not limited by the details of the foregoing description.

Generally, a user boots the target computer from a CD containing the client software. A logo for a product of the present invention may appear with a progress bar indicating boot progress. During the boot sequence, a user may elect to display the verbose boot mode for detailed boot information. Any errors encountered are also preferably logged, preferably automatically. The client system preferably supports Intel and AMD processor based computers. An operating system kernel and all required drivers will preferably be included in the CD.

Target system configuration is identified and documented. After booting, the client program will determine the configuration of the target computer and document the information.

The client program will record such information in an event log. Recorded details may include for example, the system-cock time and date, hard drives and partitions, available RAM, CPU type and speed, input-output interfaces, and the software version of the present invention. Preferably, such details are logged automatically onto the events log.

The present invention contemplates using various interfaces and memory devices for transferring the command block from the control server to the target computer. Preferably a USB interface is used along with a USB memory device. Other suitable interfaces, however, may be used as known in the art. However if a suitable interface is not available, the user will be informed of the limitations, and the present invention may operate in a reduced mode with limited functionality such as a restriction to only viewing TOC and statistics.

Also, should the target computer system not possess minimum hardware requirements for a specific version of the present invention in use, the user may be informed that product capabilities may be limited. The user may then be prompted to contact the control server vendor for advanced services.

Client Software recognizes system drives and mounts them in read only mode. Once recognized, all drives that are not destination drives of the present invention will preferably be mounted in read only mode. Thus, other than for the destination drives of the client software, the drives of the target machine are not modifiable.

The client portion of the present invention will recognize all the available drives on the target computer. It will recognize devices, including but not limited to the following drives: parallel IDE drives; serial EIDE drives; SCSI based drives (Narrow, UW, LVD, etc.); external USB/Flash drives; IOMEGA Zip and Jazz drives; CD/DVD, CD-R/RW, DVD-R/RW drives; and other known drive types.

The client portion of the present invention will preferably provide for error handling for multiple drives. Preferably, a limitless number of physical drives and logical drives may be supported. The client software will also preferably detect Host Protected Areas (or any other device level mechanisms for obscuring data) on a drive and log their existence.

Destination drive is recognized after bootup. The client program of the present invention will recognize a destination drive to be used by the client program. As discussed, preferably an initialized USB (hard drive based or memory chip based) drive is used. Such drives may be distributed by a vendor pre-initialized or can be created from commercial off-the-shelf devices that have been modified as discussed. When such a destination drive is present, the user will receive acknowledgement, preferably automatically, of the existence of the initialized drive.

The client software presents a graphical user interface that lists drives available for analysis. A graphical user interface will preferably provide the user drive information and the ability to select specific drives to analyze. Preferably without the user taking any action, the client program will display to the user all available drives indicating which drive, if any, may be selected for analysis.

The user then picks one or more drives to be analyzed. As discussed, in one embodiment, one or more drives may be selected for simultaneous analysis. In another embodiment, one drive is selected at a time for analysis. In the exemplary embodiment discussed herein, the user picks one drive for analysis.

As the user picks the drive to the analyzed, the client software preferably begins to analyze the FAT(s) of the drive selected, preferably displaying a progress bar. Next, the client program may display a table containing information about the selected physical drive. For example, a row may be displayed in the table for each physical drive detected. Information displayed in such tables may include, drive number, make and model, serial number of drive, size, numbers of logical partitions on physical drive, existence of write protect status, drive key, and existence of any obscured areas such as host protected areas and device configuration overlays.

A table of logical drives may also be displayed. Information in such tables may include individual drives, partition names and size, file system type, location on physical drive, write protect status, drive key, and presence of encryption.

Unless already performed, one of the first steps in analyzing a drive will preferably be to obtain a digital signature of the physical drive selected upon which the logical drive selected resides. As discussed, these digital signatures will be recognized by the command blocks or used by other aspects of the invention.

The file allocation tables (FAT) of drives and partitions are examined. Once a physical or logical drive is selected for analysis, the FAT(s) residing on the selected drive will be examined. The detailed results may be provided in a table format with navigation capabilities.

If a physical drive is selected for analysis, all partitions may be examined including any unallocated and lost partitions on the drive. Upon completion of drive examination, a graphical user interface may appear with a table displaying all of the contents on the drive FAT (TOC). The TOC will display the files in each drive/partition selected and may include the following information for files, creation date, last modified date, last accessed data, deletion date, file size, full path, name, and extension and other relevant information. Preferably, a "deleted" flag will indicate a deleted file, and an "exported" flag will indicate an exported file.

Preferably, the rows in the TOC may be sorted by each element. The program may also allow secondary and tertiary sorts and allows columns in the TOC to be hidden or unhidden. The ability to filter rows based on data values such as file extension, first letter of filename, date range, size range, deleted flag, exported flag and directory may also be supported.

Statistics on the data contents of the selected drive may be provided. Once a physical or logical drive is selected for analysis, the contents of the drive will preferably be examined in an abstract form. All portions of the drive will be examined including any unallocated or lost partitions on the drive and obscured disk areas. The results will be provided through statistics but no details will be provided.

At this point, keyword searching may be supported. Keywords can be searched using literal or regular expressions. The results of keyword searches may only provide a count of the number of occurrences of the keyword on the drive requested. In one embodiment, the client program allows only one keyword search in any given session. In other embodiments, multiple keyword searches can be conducted per session and/or per drive. Optionally, the ability to search for multiple keywords within a defined file or similar data structure may also be provided. In continuing to log the various activities, the results of the keyword search will preferably be displayed and saved to the event log.

Furthermore, identification of encrypted or password protected files will also preferably be supported. At this point, however, the results of encrypted or password protected search may only contain a count of the number of files that are encrypted or password protected. The locations of the files will not be stored or provided.

Additional statistics and information about the data may be displayed as known in the art. But the information displayed is limited so that the user must obtain one or more command blocks from the control server to be able to obtain and download the actual files or additional details. Alternatively, the user may export the entire contents of the drive using the client software for analysis by a third party expert.

Users may obtain command blocks from a control server. Preferably using a separate online computer, a user can purchase a command block from the control server. The command block is an instruction set that enables or allows the client program to search for and/or download data from the target computer onto its destination drive. The user navigates to a control server web site and configures a command block to be purchased.

Preferably, the control server recognizes an initialized USB drive attached to an online computer and downloads the desired command block to it. Once the command block is written to the drive, the destination drive is removed from the online computer and connected to the target machine where the client program can read and execute the command block.

Preferably, the client program will provide a drive key to the user for entering into the web site of the control server. Embedded in the drive key is information about the hard drive such as its signature, thus making the command block physically and logically hard drive specific. If information on the drive is changed, then the hard drive will change, and the command block will no longer work on the altered hard drive. Optionally, a command block may be configured to run repeatedly on a given hard drive.

User next executes the command block. Next, the user connects a USB drive with a valid command block to the target machine. Preferably, the present invention supports the hot swapping of USB drives. The Client program will first scan the USB drive for command blocks. When the scan is completed, an interface may appear listing all command blocks residing on the USB drive and information about each command block, such as a specific description or indicating whether they have previously been executed.

After selecting a command block for execution, the client program authenticates the command block to verify that it is valid for the target computer and device. In addition, the client program may verify that there is enough space on the destination drive to store the results, warning the user if insufficient space exists. Again, the execution of the command block and its contents are logged.

During execution of the command block, all date and time stamp and path information for the extracted files should preferably remain unchanged. If this is not possible, the original time data should be documented via an index file which contains information about all the recovered data. This index file preferably lists the exported data for the executed command block and includes any available FAT related data for the files, date and time of the command block execution, and operator's name.

Fragments, files from unallocated space, and other data without path information will be written to the destination drive in an appropriate directory. If requested, fragments of data containing keyword matches may retain the context in which the keyword appears on the media. For example, in one embodiment, a user may specify that a number of bytes or ASCII characters on the device immediately before and after the keyword be extracted along with the keyword itself. This would assist the user in understanding the context in which the keyword appears on the media in subsequent reviews.

The presence of files that are archived, encrypted, password protected or any combination thereof on the target drive shall preferably be displayed. Examples of such files include but are not limited to ZIP files, Pretty Good Privacy (PGP) volumes, password-protected Microsoft Office documents and password-protected ZIP files.

In one embodiment, the searching of responsive documents and keywords within archive files may be supported. In another embodiment, the decryption and cracking of encoded or password protected files or archives may be provided to determine if responsive documents and keywords exist within these tiles or archives. While the command block is being executed, progress feedback may be displayed to the user. Additional feedback display options include: displaying recovered file names or paths during extraction; displaying a running or final count and breakdown of exported data. Any errors encountered may be displayed.

Furthermore, digital signatures will be created for all data retrieved. These signatures will also be logged in the event log for future reference. To maintain the integrity of the retrieved data, all retrieved data may be exported as read-only. Any data recovered using features that do not require payment will preferably be exported to the destination drive in an encrypted state. This data may be available for decryption pending payment.

A completion notification may be displayed when the data extraction process is completed. Preferably, the user may then physically remove the destination drive without any further action while still preserving the integrity of the data on the destination drive. The user may also be provided with a prompt to review the data.

Reviewing recovered data. Once the command block has been executed and data has been downloaded to the destination drive, the user will have the option to review the retrieved data in read-only mode. Although the downloaded data is preferably transferred to a different computer for viewing at this time, the present invention also contemplates an option of creating a data browser within the target computer without modifying the hard drive(s) of the target computer.

If a user selects the option to review recovered data on the target machine, a graphical user interface will appear to allow the user to easily navigate and review the data. The user may be able to review the exported data and files in their native format. Thus, if the files are Microsoft Word files for example, the user will be able to view them in a manner which recognizes and renders any text formatting that Microsoft Word would natively adhere. If the data consists of HTML data, a simple browser will render and display any available HTML data adhering the proper formatting, However if the file is not complete, the user will be able to view the data in text mode. Further, in text mode, the user may have the ability to suppress display of non-ASCII characters to increase the readability of the data.

Reviewing recovered data will not alter the file contents in any way. The user, however, may be able to tag or otherwise label or identify the reviewed data of interest for further review. As known in the art, multiple levels and types of tagging, noting, and cross-referencing may allow users to categorize and sort the information including techniques such as in Bates numbering.

In certain embodiments this invention encompasses a USB key containing verification codes and a boot CD containing software and a Linux based operating system for purposes of preparing such forensic collection media devices in an automated fashion.

In certain embodiments, the user will be instructed after loading the boot CD to insert a valid license 'dongle' or USB key. This license/key combination will unlock a dedicated amount of drive space credits equating to the amount of drive preparation space to be used for loading forensic collection software and corresponding drive partition schema.

In certain embodiments, the user can select any input storage media to serve as the forensic output device via a drop down list listing such available devices.

In certain embodiments, the user will also be able to enter in a password, which will be used as a partition encryption key on the forensic collection drive partition.

In certain embodiments, the user can manually enter in a secure password which will be used to encrypt a partition on the forensic collection media.

Once all input methods are selected, (License Key, Destination Media Device, Partition Size, Partition Password). In certain embodiments, the user can click a "prepare" button to run the process of creating said forensic collection drive in an automated fashion pre-loading all necessary software. Pre-Loaded Software includes precise partitioning schema designated to work with said forensic collection software, License Files for uniquely identifying each drive by serial number, partition UUID, Windows Live collection executables, and an encrypted password file.

In certain embodiments, the license file designating available drive space will be reduced each time a drive is successfully prepared using above mentioned process.

In certain embodiments, the process performed will be logged to an unencrypted partition for purposes of creating an inventory and audit log. In these logs will contain, date/time media device was prepared, any encountered errors, prepared media device size, prepared media device password, prepared media device serial number.

In certain embodiments, the program and graphical interface to guide users to prepare media devices for integration with said forensic collection software will be self contained on a Live Boot CD.

Figure 3:
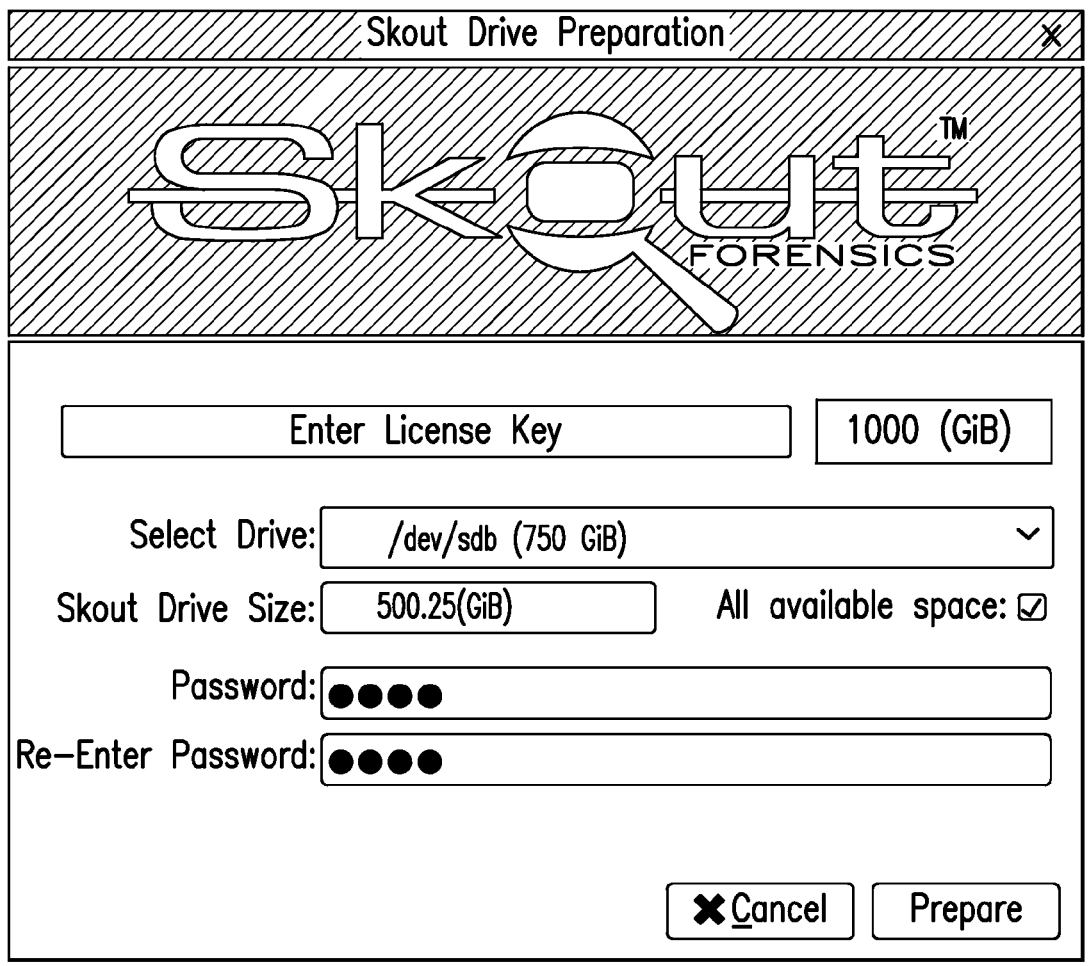
FIG. 3 illustrates an illustrative the program and graphical interface to guide users to prepare media devices for integration with said forensic collection software will be self contained on a Live Boot CD.

Process Flow:
1. User is instructed to insert license dongle
2. User is instructed to enter a password license challenge key
3. Challenge Key unlocks license database on USB thumb drive and reads corresponding drive credits.
4. User must select an output media device for which will be configured as a forensic collection device.
5. User inputs amount of collection space to use on such output media device
6. User inputs password for forensic collection partition, contained on such output media device.
7. User clicks prepare, to prepare such output media devices to be configured to the above inputs that will interact with forensic collection software. An illustrative example is illustrated in FIG. 3.

In certain embodiments, the invention encompasses binary file signature searching for identifying files created by certain programs or enumerated by certain common extensions including but not limited to:

msg
msg
eml
eml
pst
pst
ost
dbx
nsf
msg
eml
mbx
ipd
ost
dbx
nsf
msg
eml
mbx
ipd
gz
zip
tar
htm
mtml
mht
mhtm
xml
doc
asd
docx
docm
dotx
dotm
dot
pwd
pub
pot
ppt
pptx
pptm
ppsx
ppsm
pxl
wps
csv
pdf
rtf
txt
wri
msw
wp
wp4
wp5
wp6
wbk
wkb
wpd
wrk
xlc
xlk
xlb
xls
xlsx
xlsb
sltx
xltm
xlw
xlt
gz
zip
tar
htm
mtml
mht
mhtm
xml
doc
asd
docx
docm dotx
dotm
dot
pwd
pub
pot
ppt
pptx
pptm
ppsx
ppsm
pxl
wps
csv
pdf
rtf
txt
wri
msw
wp
wp4
wp5
wp6
wbk
wkb
wpd
wrk
xlc
xlk
xlb
xls
xlsx
xlsb
sltx
xltm
xlw
xlt
wk1
wk2
wk3
wk4
mda
mdb
accdb
wks
wk1
wk2
wk3
wk4
mda
mdb
accdb
wks
tif
tiff
mdi
tif
tiff
mdi In certain embodiments, the invention encompasses a method for indentifying and markings files with certain extensions and then extracting such files from the full forensic image into a .csv table.

In certain embodiments, the invention encompasses a method for compiling a .csv file or load file containing all files with specific binary file signatures or common extensions for use in transferring data to an external platform.

Input files can be any bit-stream image or physical device

Output destination subfolder is automatically created as a time-stamp folder name Output destination subfolders will categorize extracted files meeting such criteria into folders based on relative file type, including but not limited to:

Active\Edoc_UnSupp
Deleted\Edoc_UnSupp
Active\Email_Other
Deleted\Email_Other
Active\Edoc_UnSupp
Active\Email-Netscape
Deleted\Email-Netscape
Active\Edoc_IMGs
Deleted\Edoc_IMGs
Deleted\Email_Loose
Active\Email_Loose
Active\Email_PST
Deleted\Email_PST
Active\Edoc
Deleted\Edoc In certain embodiments, the program will extract files that have been "marked" for deletion, thereby performing basic file recovery In certain embodiments, the output files will be de-duplicated against one another based on MD5 signature and file name.

In certain embodiments files identified as duplicates will be logged with the following detail, file name, file path, file Modified/Created/Accessed dates, file size, and file MD5 signature.

In certain embodiments, the user will be able to add any custom file extensions to the list of files to be extracted.

In certain embodiments, the user will be able to add any custom file header or footers, thereby signatures of files for identification and extraction.

In certain embodiments, the user will be able to select to include deleted file to be extracted.

In certain embodiments, the user will be able to select a date range to limit files extracted that match such input dates.

Harvesting Tool

Figure 4:
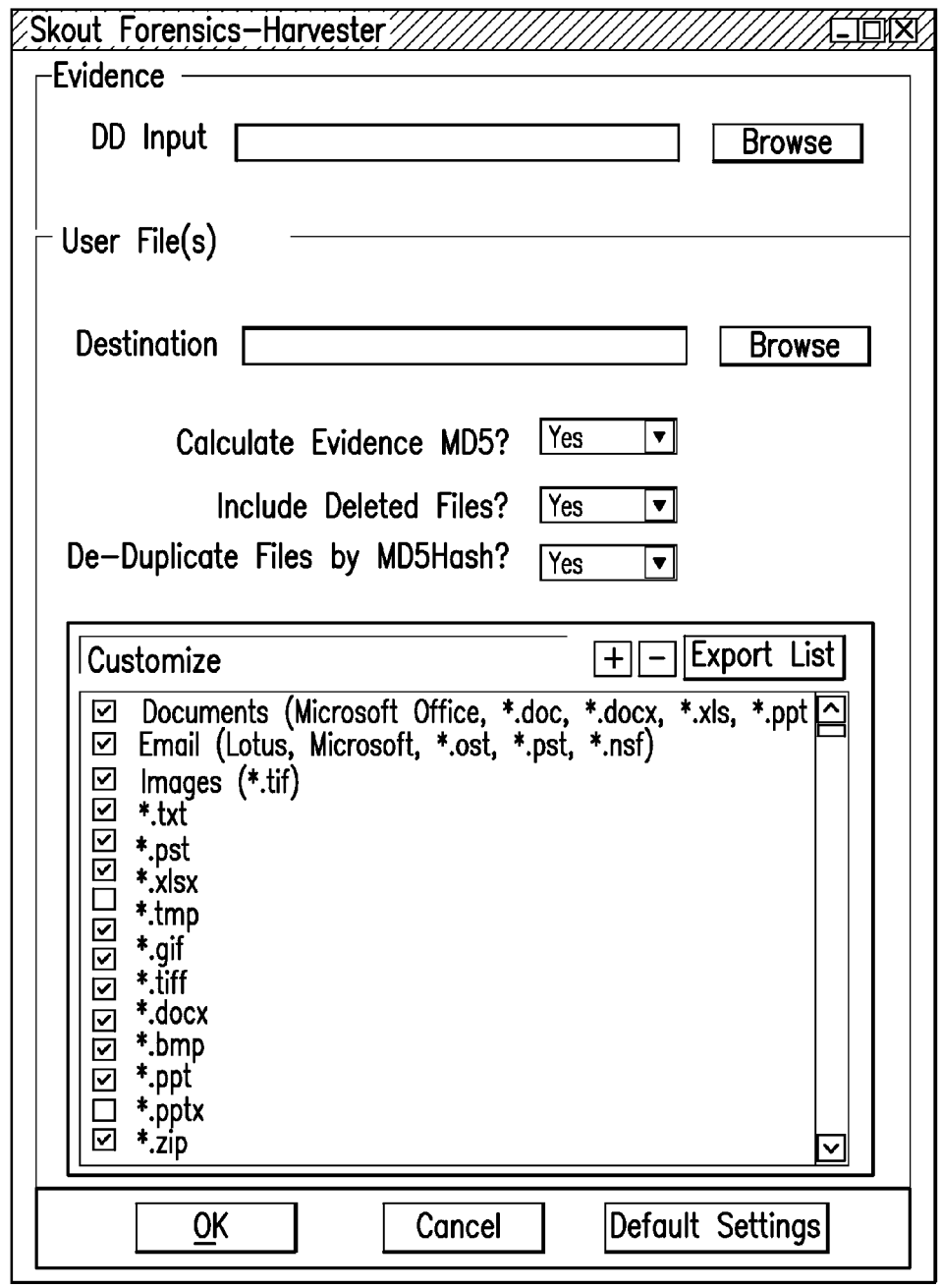
FIG. 4 illustrates an image of a graphical interface the Harvester of the invention.

In other embodiments, the invention encompasses a "Harvesting" tool that reads the output image data or physical drive that exists or is created from such forensic collection tools. An illustrative image of the Harvester is illustrated in FIG. 4. In certain embodiments, the tool interprets the file structure for FAT or NTFS partitions. In certain embodiments, the tool parses out specific files based on file extension and/or file signature to a specified destination location. In certain embodiments, the tool has limited interface options. In certain embodiments, the tool is able to parse out and extract Active and Deleted files. Deleted files are those that have not yet been overwritten and fully recoverable without "carving" them. In certain embodiments, the tool when parsing out these specific files the "MAC" or Modified/Accessed/Created dates will not be altered during the extraction process. In certain embodiments, the files are parsed out into a pre-determined folder structure. An option to calculate the MD5 hash of the input data files can be selected. As well each file extracted will have a unique MD5 sum calculated and logged to a CSV file. In certain embodiments, an option to de-duplicate these files based on similar MD5 is possible.

Process Flow
1. DD/Drive input selected
2. Read and extracts files from NTFS/FAT data file(s)
3. Identify static set of files by "Signature" and "Extension", customizable list 4. Output selected files into folder structure maintaining MAC (modified/Accessed/Created) times.
5. MD5 Hash output files and remove duplicated based on hashes.

Figure 5:
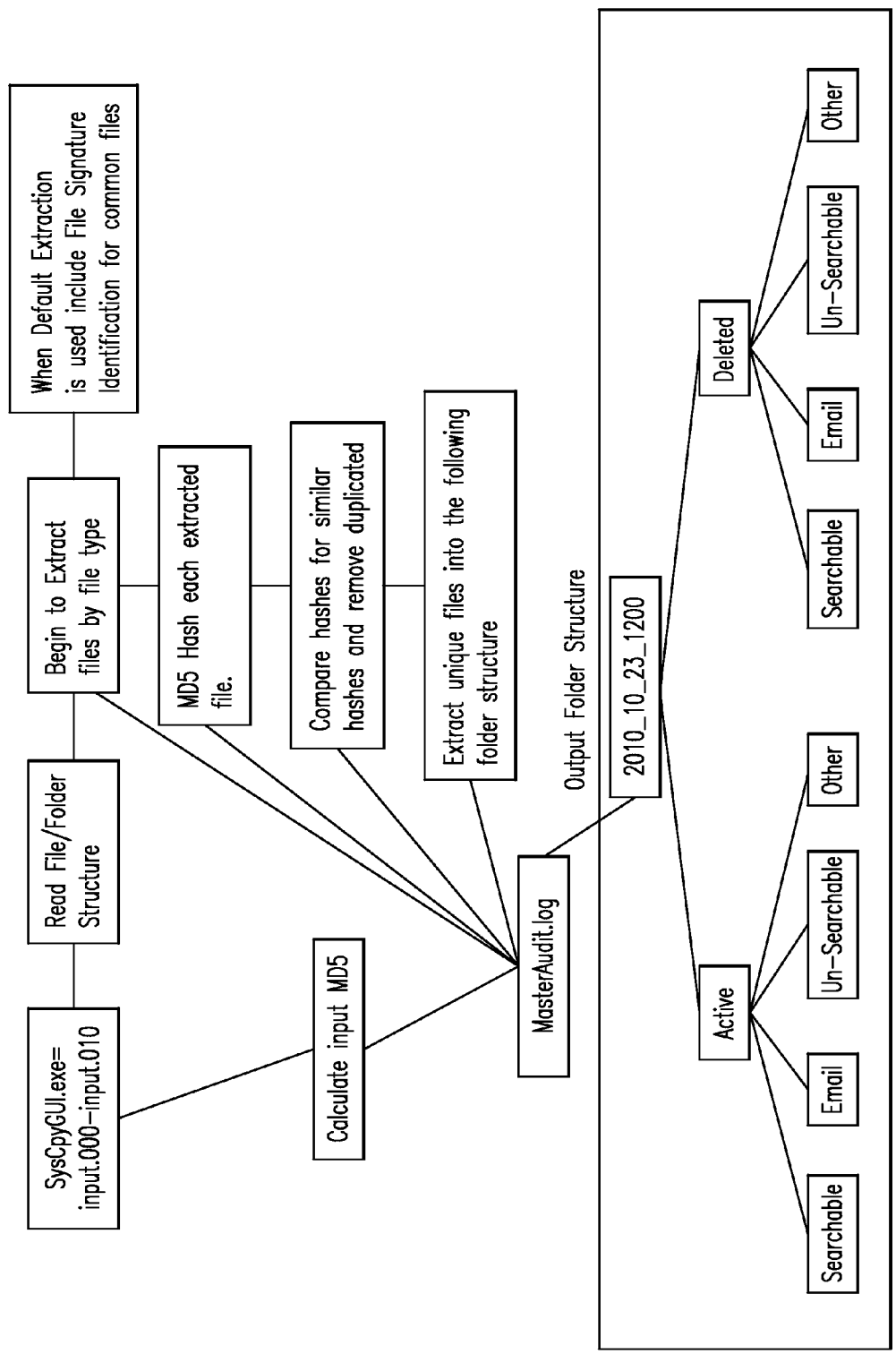
FIG. 5 illustrates an illustrative description of the process flow of the Harvester of the invention

An example of the process flow is illustrated in FIG. 5.

The following is a description of an embodiment of the destination drive of the present invention, Other destination drives as known in the art may be used. The destination drive is preferably a USB connected storage device, capable of containing any command blocks and data retrieved from the target machine.

Physical device specification. In a preferred embodiment, the destination drive will comprise a storage device with a USB interface. The device will preferably support NTFS, FAT12/16/32, and Linux file systems, among others.

Device initialization. The destination drive initialization process will preferably be supported on Windows, Macintosh and/or Linux environments, or other applications as known in the art. Prior to drive initialization, the user may be warned that all data on the device will be deleted.

Upon connection to the target machine, the destination drive should preferably be recognized by the control server vendor without requiring a reboot or other interruption of the examination process. Subsequent analysis of the same drive should append to the logs on the destination drive or write new files using incremental file names. Additionally, warnings about overwriting the data on the destination drive should be provided.

Before exporting data to the destination drive, the user may be notified if available space in the destination drive is insufficient to store the amount of data to be exported. In the preferred embodiment, the user will be able to span the exported data across multiple destination drives thereby providing the ability to export a limitless amount of data.

EXAMPLES

Example 1

Option 1 (one), is the option to perform a live forensic acquisition, and initially relies on the assumption that the live system is a Windows based Operating system. An executable will automatically be executed and the process of acquiring the Live Physical Memory will begin. In the event that the Autorun technology feature does not execute the program the user is instructed to manually execute this process. During the imaging process, the user is locked from the computer until the process has completed. All user input is prevented. The user will only see a message indicating the process and a status bar indicating the amount of time remaining until the entire process has completed. The process will copy all running process, network connections, open network ports, screen capture and logged in users to the Forensic Hard Drive in a standard log format. Additionally, the "\\Device\\PhysicalMemory" will be copied out to the Forensic External Hard Drive. Once executed the program will lock all background processes and prevent any input during the preservation and copying stage. The program will also initiate a bit-stream physical copy of all attached media to the Forensic External Hard Drive. It will progressively scan for ALL attached media, and upon identification query the media device information, which will include at a minimum; make, model, serial number, etc., and output to the Forensic Hard Drive. It will also perform an MD5 hash value calculation of the media and output the value to the Forensic Hard Drive. This entire process from the start of the launch of the program and through each process until the completion is continuously written as a log file which depicts time stamps and full details of the processing being performed. Once the entire process has completed, the Forensic Hard Drive will be locked using a password pulled from a unique identifier embedded on the Forensic Hard Drive and locked by sending an ATA-Command. There is no way to obtain this password once locked.

Example 2

Option 2 (two), is to perform an acquisition of a powered of system. The user would be instructed to insert the provided CD, USB hard drive, or USB Floppy Disk Drive and power up the system. The user would be instructed to boot into the Forensic CD or Forensic External Hard drive, or Floppy Disk or combination of. For compatibility purposes any combination of pre-formatted partitions that will emulate a Floppy boot Disk, CD-ROM boot Disk, or USB-Hard Drive boot partition will be pre-loaded onto the External hard drive ensure that the user does not need to alter the BIOS boot order. However, in some instances the user will be required to change the BIOS boot order, detailed instructions will be included to accomplish this. Once the boot process has begun, the Forensic Program which is written into a modified Linux Distribution such as Ubuntu or similar Linux distribution will automatically execute. The Linux kernel would not mount any devices other than the attached Forensic External Hard Drive. The Forensic External Hard Drive would be detected and auto mounted by pre-programming into the script the detection of a unique value contained within the Forensic Hard Drive. All load settings would be pre configured so the user would never have to input any commands. The imaging Forensic program is a combination of commands that are executed one after another eliminating the need for user input during the Forensic Acquisition/Imaging/Preservation of Digital media. The user can have the option to initiate the program by striking "ENTER" or clicking "OK", however this is not required to initiate the program as a pre-set timer will execute the process automatically if no input is entered. Once started the user can not interrupt the process, and no user input can be performed until the process has completed, During the process the user will only see a progress bar indicating the amount of time remaining.

The program is initiated after the user boots into the Linux OS, either by CD, Emulated Floppy boot Disk, Emulated CD boot disk or bootable USB Hard drive, or Floppy Disk Drive, the program is read from the Forensic External hard drive or CD. The program will initiate a bit-stream copy of all physically attached media to the Forensic External Hard Drive. It will progressively scan for ALL attached media, and upon identification query the media information, which will include at a minimum; make, model, serial number, etc. and output to the Forensic Hard Drive. It will also perform an MD5 hash value calculation of the media and output the value to the Forensic Hard Drive. This entire process from the start of the launch of the program and through each process until the completion is continuously written as a log file which depicts time stamps and full details of the processing being performed. Once the entire process has completed, the Forensic Hard Drive will be locked using a password pulled from a unique identifier embedded on the Forensic Hard Drive and locked by sending an ATA-Command. There is no way to obtain this password once locked. Once the imaging process has completed and the drive locked the CD-ROM if used will be automatically ejected and the computer will automatically be shutdown, leaving no apparent trace of its use. Alternatively, the user will be prompted of the completed action and have the option to strike "ENTER" or click "OK" to initiate the above mentioned shutdown process, however if no input is entered a timer will automatically perform the shutdown process.

The user would be instructed to package up all the Forensic Field Kit items into the original box they came in. The user would be instructed to place the self enclosed return shipping label on the box and seal the contents with a pre-cut strip of tamper evident tape, or tamper evident plastic tie.

The forensic field kit contents would then be opened and the reporting portion of the product would be conducted in a forensic manner by a trained forensic professional. A working copy would be made of the original evidence. The report will utilize all unallocated space and active space of the evidence image and will be included in the report, and at a minimum the report will include the following topics as they pertain to computer evidence of the desired activity conducted via a computer.

Hash analysis, File Signature analysis, Deleted Folders recovery, keyword searches, conversion and recovery of Microsoft mail items, Address book export, Steganography analysis, multiple file format Data Carving, INFO2 Analysis, Web Mail Carving, Web Mail Analysis, Event Log Analysis, Gmail Data Carving, Gmail Message Reconstruction, Web based chat data carving, registry analysis, ROT13 Registry decoding, Attached Devices by Volume Serial, Attached Device Contents, Wiping program analysis, Last connected interne date/time, first install of OS, OS version & SP, System information, Windows Account Names and Passwords, Geo-IP as last connected network, Web Banking Data Carve, Social Media analysis, Deleted Items Analysis, Top 10 most frequently occurring web tins, proprietary subject matter URL Database discovery, Web Search Term Analysis, Encrypted and Protected file lists, Link File Analysis, Prefetch Analysis, and iPhone and Blackberry Synced/backup file parsing.

Once processing has been completed the report will be sent either electronically via e-mail, or in hard copy format via mail courier t the customer. Additionally, the user can request the raw image data, which would be provided in a forensic format such as DD, E01, etc.

In addition to the report and request for the raw evidence files, the customer has the option to request a pre-compiled Virtual Machine of the Evidence. This means the customer can double click the virtual machine file and it will virtually boot into the Operating system as if it was the original where the evidence was pulled from. It will emulate an exact copy of the machine that the evidence was collected from. An additional service would be to either reset User passwords or provide in plain text the User Names and Passwords for Accounts on the machine. This feature will enable any person to easily navigate the evidence as if they were on the machine without fear of tampering with the evidence.

Example 3

Skout Report

The automated Skout Report is a highly optimized Forensic Examiner written into a turn-key program, executable by anyone. The Skout Report was written to minimize the amount of hands on time required by an examiner during digital investigations. it was written and designed by Forensic Experts who understand the demanding needs of Government, Law Enforcement, Private Eyes, and Lawyers. It utilizes all the advanced forensic analysis techniques generating turn-key reporting capability that can quickly and effectively uncover a sleuth of data usually only obtained after hours of a forensic examiners time.

The Skout Report Backend and Engine can be built into high end dedicated systems to maximize processing time. The user simply selects which evidence Item to be processed, and checks any combination of output items to process. The Skout Report is generated and output as HTML or CSV.

User Selects any combination of Output Items:
1. Registry Items (750 Options)
   a. System Info
   b. Password Present
2. Internet Items
   a. Internet Searches Used
   b. Suspicious URLs
   c. Most frequent URLs
   d. Web Banking Info
   e. Social Media Sites
   f. Web Chats
3. Mail
   a. Gmail
   b. Yahoo
   c. Hotmail
   d. AOL
   e. Go-Daddy
   f. Other
4. Corporate Email
   a. Outlook (All)
   b. Lotus Notes
5. Common User Files
   a. Responsive file listing and 90 Char Preview
6. Smart Phone/PDA Backups
   a. Blackberry (All)
   b. iPhone
7. Evidence Formats Supported:
   a. Expert Witness (E01)
   b. RAW (dd)
8. File System Support:
   a. Windows (MSDOS, FAT, VFAT, NTFS)
   b. MAC (HFS)
   c. Solaris (UFS)
   d. Linux (EXT2/3)
9. File Carve:
   a. Header/Footer Carving
   b. Fragment Recovery Carving
10. Data Parsing:
    a. Web Mail
    b. Internet Cache
    c. Instant Messaging
    d. Passwords
    e. Smart Phone/PDA Backup Conversions
11. Data Normalization and Conversion:
    a. Registry
    b. Email Formats
12. Indexing:
    a. DtSearch Engine
13. Hardware Supported:
x86
    a. Maximum CPUs: 32 (including logical CPUs)
    b. Maximum memory: 64 GB
    c. Maximum filesize: 8 TB
    d. Maximum filesystem size (ext3): 16 TB
    e. Maximum per-process virtual address space: 4 GB
13X64
    a. Maximum CPUs: 256
    b. Maximum memory: 256 GB
    c. Maximum filesize: 8 TB
    d. Maximum filesystem size (ext3): 16 TB
    e. Maximum per-process virtual address space: N/A Example 4

The Skout Forensics kit offers leading-edge technology to assist in computer investigation, electronic discovery, data recovery, data preservation, and data analysis. Using a combination of industry-standard, open source and proprietary forensic tools, our clients can benefit from the portability and ease of use.

The current standard operating procedure behind all Digital Forensic Investigations begins with a trained computer forensic examiner collecting data. The Skout Kit was developed with one goal in mind, to eliminate the need for a trained digital Forensic Examiner when performing data collections. The Skout Kit can enable any individual to flawlessly perform a full Computer Forensic data collection easily and cost effectively while maintaining the forensic integrity.

The Skout kit comes with a court ready affidavit report disclosing the technology and process utilized by the Skout Kit to acquire the data and protect its integrity for forensic analysis. This affidavit certifies the manner in which the data has been collected to ensure admissibility of the data collected.

Kit Contents:
a. Portable Customized Pelican Case (water resistant, crushproof and dust proof)
b. Universally compatible boot/load disk media (All standard PCs and most Apple computers)
c. External storage device(s)
d. Tamper evident seal
   Functional Specifications:
   Automated Acquisition
a. Live System or "Powered Off" use
b. Universally bootable/Run CD
c. DCFLDD/DD imaging technology
d. Full physical images of all attached devices. (includes unallocated space, file systems, boot records, and all other data from start disk cluster to end disk cluster)
e. Image(s) saved in a Forensically sound container "dd" format, which can be analyzed by:
f. Skout Analyzer/Report
g. Encase
h. FTK
   i. X-Ways
i. x32 and x64 RAM acquisition
j. Write to multiple output drives simultaneously (one master copy and secondary copy simultaneously)
k. No maximum size limit
l. Image verified by MD5 hash
m. Hardware and software RAID support
n. File systems: FAT12/16/32, HFS, HFS+, NTFS, UFS, ZFS, EXT2/3, BSD FFS, FreeBSD's UFS2, NSS, NWFS, AIX, JFS (all)
   Hardware Compatibility
a. All x86 and x64 systems including most* Apple computers
b. Detects and images ALL attached devices, (USE, Firewire, eSATA, etc including RAM
c. Identifies the "Output" drive so evidence is saved automatically
d. Boot interface compatible with most* standard PC/Apple computers
e. Live system compatible with all variances of the Windows Operating System(s)
   Ease of Use
a. One "Enter" stroke required to initiate full forensic image from start to finish
b. Progress bar recognizing "time remaining" for imaging process displayed
c. Notification of potential errors as well as conclusion of imaging process
d. Images each device attached to computer
e. Seamlessly encrypts data and locks hard-drive when process has completed
f. Automatically queries device information:
   i. Make/Model
   ii. Serial Number/Volume Serial Number
   iii. Sectors
   iv. Size
   v. Connected Port
   vi. MD5 Hash
g. Outputs each image into designated folder
h. Detects when (one or two) drive output imaging mode is to be used
i. Alerts user to how many drives are required to complete imaging process prior to starting
   Chain of Custody/Audit Trail
a. Time Stamped Log
b. Full detailed audit log
c. Full device information log
d. Error logging
e. Drive Locked using an embedded Unique Identifier, preventing data from being copied, deleted or accessed
   Security
a. 128-Bit MD5 Hash of each device for verification
b. Secure with 256-Bit AES encrypted volume
c. Two-Password ATA-Drive Lock Command (prevents overwriting and access of data)

In the specification, there have been disclosed typical preferred embodiments of the invention and, although specific terms are employed, they are used in a generic and descriptive sense only and not for purposes of limitation. Obviously many modifications and variations of the invention are possible in light of the above teachings. It is therefore to be understood that the invention may be practiced otherwise than as specifically described.

Unless defined otherwise, all technical and scientific terms and any acronyms used herein have the same meanings as commonly understood by one of ordinary skill in the art in the field of this invention. Although any compositions, methods, kits, and means for communicating information similar or equivalent to those described herein can be used to practice this invention, the preferred compositions, methods, kits, and means for communicating information are described herein.

All references cited above are incorporated herein by reference to the extent allowed by law. The discussion of those references is intended merely to summarize the assertions made by their authors. No admission is made that any reference (or a portion of any reference) is relevant prior art. Applicants reserve the right to challenge the accuracy and pertinence of any cited reference.

What is claimed is:

1. An electronic forensics tool comprising:
   a physical portable memory device, wherein said physical portable memory device is capable of connecting to a target device; and
   a forensic acquisition script, wherein said forensic acquisition script is able to load onto said target device and analyze hardware and software configurations of said target device and copy physical memory from the target device to the physical portable memory device, wherein the forensic acquisition script calculates digital signatures, message digests or hash values of available data storage devices in said target device and said physical portable memory device to verify that no modifications are made to the devices by comparing the corresponding digital signatures, message digests or hash values to each other;
   wherein a virtual machine file is generated based on the forensic acquisition script which, when executed by a virtual machine in a virtual machine environment, provides an exact copy of the target device to enable a user to navigate files of the target device in the virtual machine environment.

2. The electronic forensics tool of claim 1, wherein the physical portable memory device comprises one or more external USB Hard Drive or other external media to be connected and/or inserted to execute a data collection process.

3. The electronic forensics tool of claim 1, wherein the forensic acquisition script is an autorun forensic acquisition script comprising pre-loaded software, which will automate the collection, and at the interface level of this software no user input is required, making for a fully autonomous forensic data capture.

4. The electronic forensics tool of claim 1, wherein the physical portable memory device comprises a varying capacity external hard drive.

5. The electronic forensics tool of claim 1, wherein the forensic acquisition script examines said target device while it is in read-only mode.

6. The electronic forensics tool of claim 1, wherein the forensic acquisition script examines data in the target device while it is in read-only mode, wherein data is stored only in random access memory, without creating evidence of forensic activity on said target device.

7. The electronic forensics tool of claim 1, wherein the forensic acquisition script documents and logs information about said target device and documents and logs activity of the forensic acquisition script.

8. The electronic forensics tool of claim 1, wherein the forensic acquisition script documents and logs information about said target device and documents and logs activity of said client program for authentication, and wherein the forensic acquisition script is digitally encrypted, signed and stored.

9. The electronic forensics tool of claim 1, wherein examination results are displayed in limited examination result form, which comprise one or more of: data existence, numbers of keywords match, and one or more file attributes.

10. The electronic forensics tool of claim 9, wherein said limited examination result form further comprises one or more of keyword searching, keyword searching with context, data filtering, binary file signature searching, keyword searching through archives such as compressed or zipped files, keyword searching through encrypted or password protected files, physical keyword searching, Internet usage history parsing, searching by relevance, de-duping data, excluding data searches based on presence of data in one or more search databases; and including searches based on presence of data in one or more search databases.

11. The electronic forensic tool of claim 1, further comprising an encrypted copy of entire data storage device of said target device or make an encrypted copy of data identified by said examination or command-block enabled examination of said target device.

12. A method of obtaining forensic data from a target computer comprising:
    connecting a physical portable memory device to a target device;
    running a forensic acquisition script, wherein said forensic acquisition script is able to load onto said target device and analyze hardware and software configurations of said target device and copy physical memory from the target device to the physical portable memory device, wherein said forensic acquisition script calculates digital signatures, message digests or hash values of available data storage devices in said target device and said physical portable memory device to verify that no modifications are made to the devices by comparing the corresponding digital signatures, message digests or hash values to each other; and
    generating, based on the forensic acquisition script, a virtual machine file which, when executed by a virtual machine in a virtual machine environment, provides an exact copy of the target device to enable a user to navigate files of the target device in the virtual machine environment.

13. The method of claim 12, wherein the physical portable memory device comprises one or more external USB Hard Drive or other external media to be connected and/or inserted to execute a data collection process.

14. The method of claim 12, wherein the autorun forensic acquisition script comprises pre-loaded software, which will automate the collection, and at the interface level of this software no user input is required, making for a fully autonomous forensic data capture.

15. The method of claim 12, wherein the physical portable memory device comprises a varying capacity external hard drive.

16. The method of claim 12, wherein the forensic acquisition script examines said target device while it is in read-only mode.

17. The method of claim 12, wherein the forensic acquisition script examines data in the target device while it is in read-only mode, wherein data is stored only in random access memory, without creating evidence of forensic activity on said target device.

18. The method of claim 12, wherein the forensic acquisition script documents and logs information about said target device and documents and logs activity of the forensic acquisition script.

19. The method of claim 12, wherein client program documents and logs information about said target device and documents and logs activity of the forensic acquisition script for authentication, and wherein said log is digitally encrypted, signed and stored.

20. The method of claim 12, wherein examination results are displayed in limited examination result comprise one or more of: data existence, numbers of keywords match, and one or more file attributes.

21. The method of claim 20, wherein said limited examination further comprises one or more of keyword searching, keyword searching with context, data filtering, binary file signature searching, keyword searching through archives such as compressed or zipped files, keyword searching through encrypted or password protected files, physical keyword searching, Internet usage history parsing, searching by relevance, de-duping data, excluding data searches based on presence of data in one or more search databases; and including searches based on presence of data in one or more search databases.

22. The method of claim 12, further comprising an encrypted copy of entire data storage device of said target device or make an encrypted copy of data identified by said examination or command-block enabled examination of said target device.

23. An electronic forensics tool comprising:
    a physical portable memory device, wherein said physical portable memory device is capable of connecting to a target device;
    bootup software stored on the physical portable memory device configured to boot the target device
    a forensic acquisition script, wherein said forensic acquisition script is able to load onto said target device and analyze hardware and software configurations of said target device and copy physical memory from the target device to the physical portable memory device; and wherein a virtual machine file is generated based on the forensic acquisition script which, when executed by a virtual machine in a virtual machine environment, provides an exact copy of the target device to enable a user to navigate files of the target device in the virtual machine environment.

* * * * *